INVENTOR
ELMAN R. DUNN

INVENTOR
ELMAN R. DUNN

MATCH FIG. 7a

INVENTOR
ELMAN R. DUNN

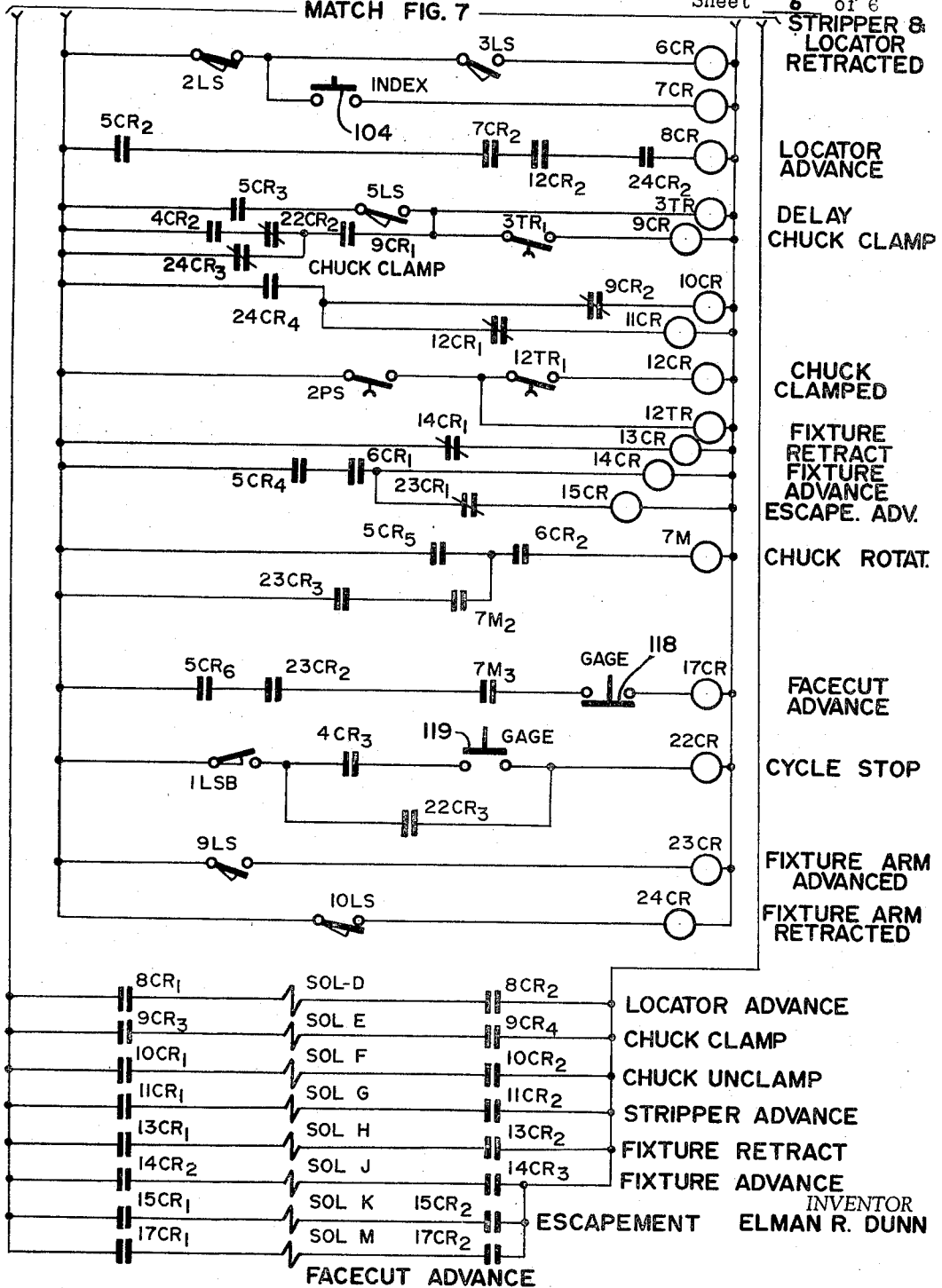

United States Patent Office 3,425,169
Patented Feb. 4, 1969

3,425,169
WORK POSITIONING APPARATUS FOR GRINDING MACHINE
Elman R. Dunn, Roscoe, Ill., assignor to Landis Tool Company, Waynesboro, Pa., a corporation of Pennsylvania
Filed June 24, 1965, Ser. No. 466,582
U.S. Cl. 51—118                     15 Claims
Int. Cl. B24b 5/00, 29/00, 47/02

ABSTRACT OF THE DISCLOSURE

The disclosure of this application relates to a means for locating a workpiece in a predetermined axial position relative to a grinding zone. The workpiece is removed axially from a loading turret by a locating member consisting of three angularly spaced fingers, against which the workpiece is held by an oppositely positioned spring-actuated member. The locating member is moved endwise by a hydraulic motor onto an expanding arbor to an axial position determined by a pair of co-acting stops at the rear of the locating member where they are protected from debris produced by the grinding operation. At the end of the grinding operation, the spring-actuated member is actuated positively in an axial direction to remove the workpiece from the arbor.

---

This invention relates in general to new and useful improvements in work positioning apparatus, and more particularly to a novel work positioning apparatus particularly adapted for positioning a workpiece relative to grinding disks of a grinding machine.

A primary object of this invention is to provide a novel workpiece locator which is adapted to receive a workpiece from a supply mechanism and accurately position the workpiece for engagement by a workpiece support whereby the workpiece may be accurately positioned on the support for further engagement by machine elements.

Another object of this invention is to provide a locator which is particularly adapted for accurately positioning a workpiece of the type including a body having a reference shoulder thereon, the locator including a plurality of spring fingers which are engageable about the body of the workpiece and in abutment with the reference shoulder so that the fingers will automatically accurately position a workpiece.

Another object of this invention is to provide a work positioning apparatus which includes co-axially mounted locator and chuck and a supply mechanism for positioning a workpiece between the locator and the chuck, the locator being constructed so as to pick up the workpiece from the supply means and accurately position the workpiece relative to the chuck, and the chuck being of the pressure actuated multiple point gripping type wherein the chuck, when it damps the workpiece, retains the workpiece in the position determined by the locator.

Still another object of this invention is to provide a novel work positioning apparatus as set forth above wherein the chuck is mounted for lateral movement independently of the locator whereby the chuck may be utilized to present the workpiece to a machine tool.

A further object of this invention is to provide a novel workpiece locating apparatus which includes a supply turret positioned intermediate co-axially positioned locator and chuck for positioning sequentially workpieces between the locator and the chuck, the locator being particularly constructed for engaging and receiving a workpiece carried by the turret and accurately positioning the workpiece relative to the chuck, the chuck being of the pressure expanding type and engageable with the workpiece at multiple points to maintain the location of the workpiece determined by the locator, and there being associated with the chuck a stripper which is operable to remove the workpiece from the chuck after a machining operation has been performed thereon with the workpiece being returned to the turret for movement to a discharge position.

A still further object of this invention is to provide a novel grinding apparatus particularly adapted for face grinding opposite ends of a tubular member having a reference shoulder. The grinding apparatus including a turret which is indexible to position a workpiece between co-axially located locator and chuck, a support mounting the locator for axial movement towards and away from the chuck and being engageable with the workpiece positioned by the turret to accurately locate the workpiece relative to the chuck, the chuck being of the type which is expandible to grip the workpiece and maintain the position thereof determined by the locator, the chuck having means attached thereto for rotating the same and moving the same laterally in between two opposed grinding disks of the grinding machine, the grinding machine having automatic control means for bringing the disks into engagement with opposite ends of the workpiece and performing a predetermined grinding operation thereon, the machine also having control means for automatically returning the chuck and the associated workpiece back into co-axial alignment with the locator, and a stripper movable in response to the repositioning of the chuck to strip the ground workpiece from the chuck and reposition the same within the turret for removal thereby.

With the above and other objects in view that will hereinafter appear, the nature of the invention will be more clearly understood by reference to the following detailed description, the appended claims and the several views illustrated in the accompanying drawings:

Figure 7:
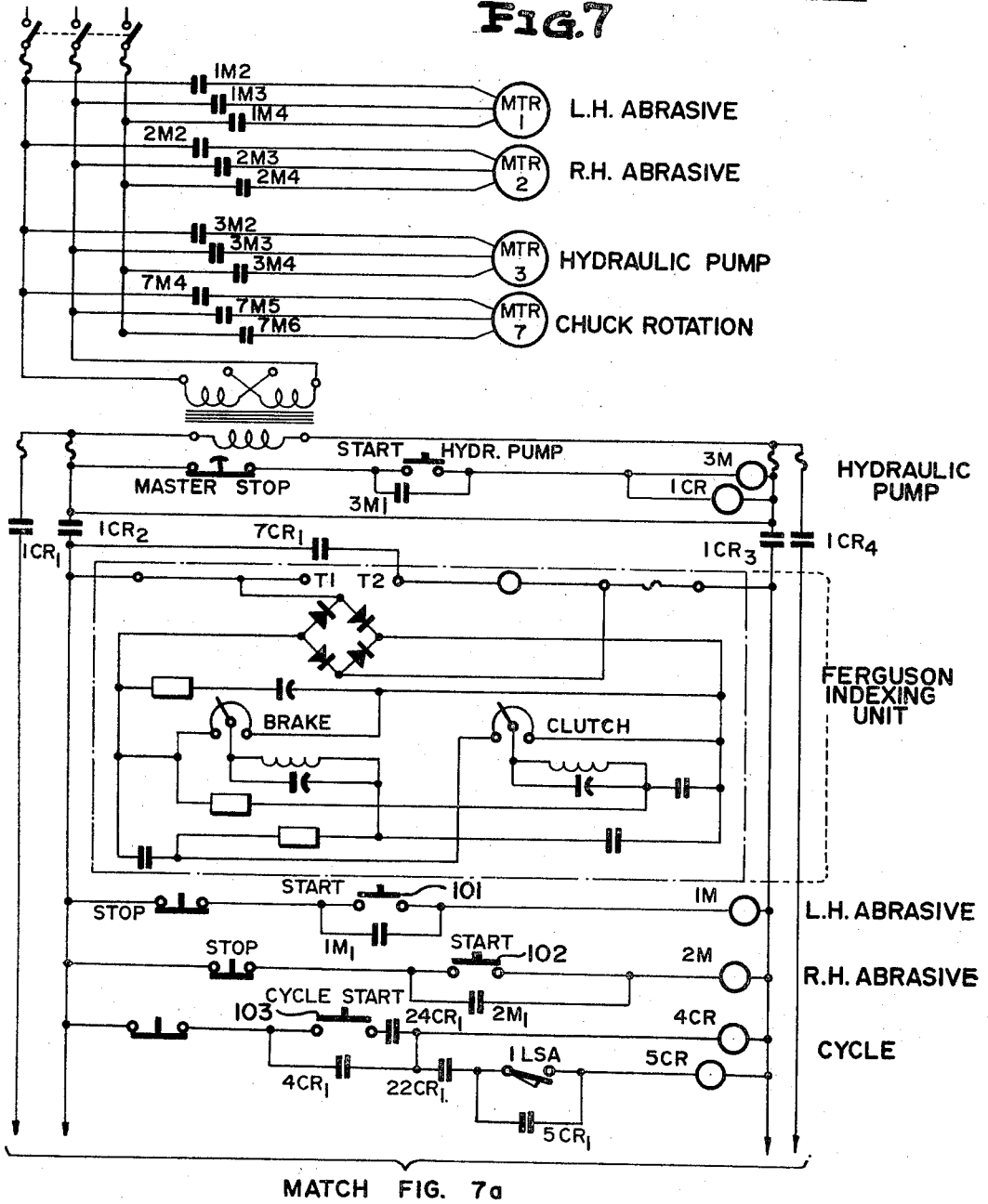

FIGURES 7 and 7A combined are a wiring diagram of the control mechanism of the grinding machine.

Referring now to the drawings in detail, it will be seen that there is illustrated a grinding machine formed in accordance wih this invention, the grinding machine being generally referred to by the numeral 10. The grinding machine 10 includes a supporting frame structure, which is generally referred to by the numeral 11. Only portions of the actual frame of the machine 10 are illustrated in that no part of this invention has to do with frame construction.

The grinding machine includes a pair of opposed grinding disks 12 and 13 which are intended to perform face grinding operations. The disk 12 is supported by a shaft 14 while the disk 13 is supported by a shaft 15. The disks 12 and 13 are rotated in the operation thereof, and are mounted for movement towards and away from one another. It is to be understood that there will be associated with the disks 12 and 13 suitable dressing apparatus, gauges, etc. which are conventional in grinding machines of this type and which of themselves play no part in this invention. Accordingly, these conventional mechanisms of grinding machines are not illustrated here nor described further hereinafter.

Figure 3:
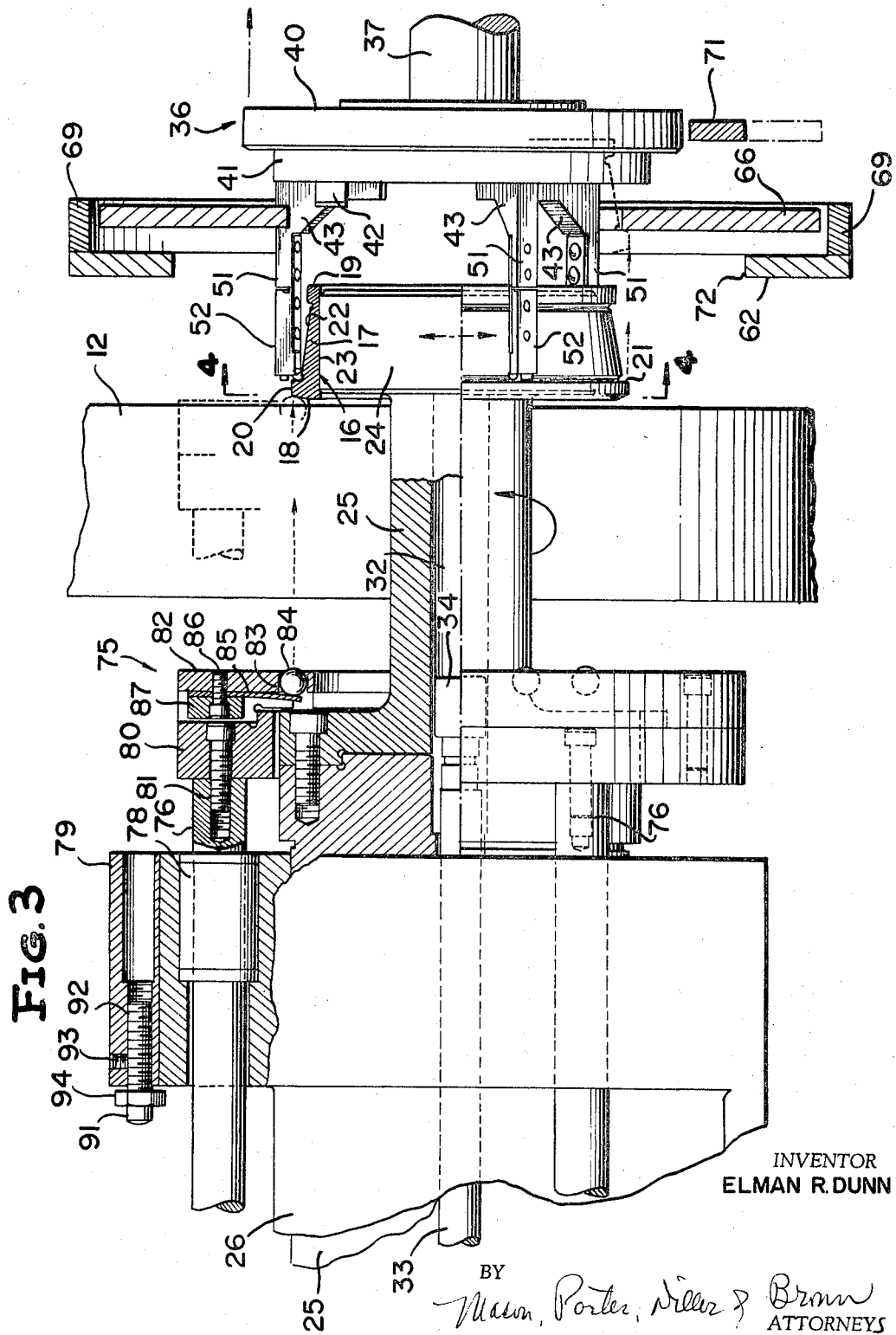
FIGURE 3 is an enlarged fragmentary longitudinal sectional view taken along the line 3—3 of FIGURE 2 and shows specifically the details of the locator, the chuck and the stripper of the grinding machine with the locator having positioned a workpiece relative to the chuck prior to the presentation of the workpiece to the grinding disk by the chuck, the stripper being shown withdrawn for clarity.

The grinding machine 10 is particularly adapted for facing the opposite ends of a workpiece 16 which is best shown in FIGURE 3. The workiece 16 has a tubular body 17 of which opposite ends 18 and 19 are to be face ground. The tubular body 17 has a projecting portion 20 adjacent the end 18 with this projecting portion 20 presenting a reference shoulder 21 facing generally towards the end 19. It is to be noted that the body 17 has a tapered outer surface 22 which flares towards the projecting portion 20. It is also to be noted that the bory 17 has a cylindrical inner surface 23.

Figure 5:
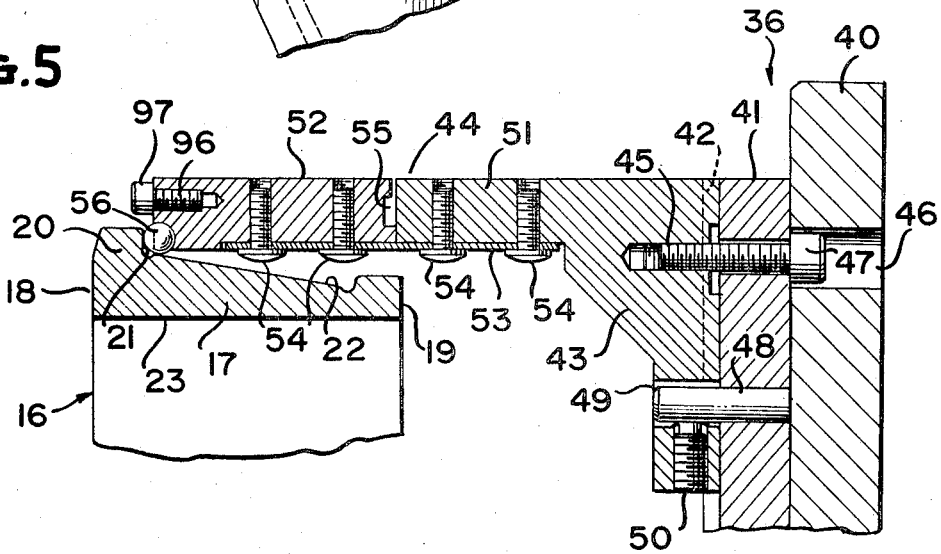
FIGURE 5 is an enlarged fragmentary longitudinal sectional view taken along the line 5—5 of FIGURE 4 and shows specifically the details of one of the fingers of the locator and the relationship thereof with respect to the workpiece.

The specific cross section of the workpiece 16 is best illustrated in FIGURE 5.

In order that the workpiece 16 may be presented to the grinding disks 12 and 13, the grinding machine 10 includes a chuck 24. The chuck 24 is of the pressure expanding type and will firmly engage a tubular member telescoped thereover without changing the position of the tubular member when clamping the same in any direction. The chuck 24 is a purchased item and will not be described in more detail here.

Figure 2:
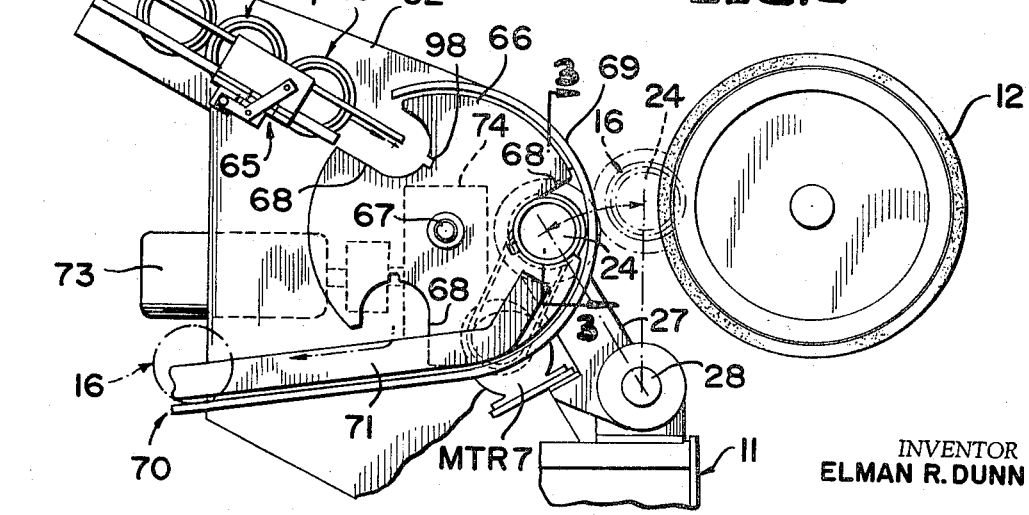
FIGURE 2 is a fragmentary transverse sectional view taken along the line 2—2 of FIGURE 1 and shows specifically the details of workpiece handling and positioning apparatus of the machine.

The chuck 24 is carried by a shaft 25 which in turn, is mounted within a suitable bearing structure 26. The bearing structure 26 is supported from a pivotally mounted support element 27 which is mounted for pivotal movement about the axis of a shaft 28 which is best shown in FIGURE 2. The support element 27 supports an electric motor MTR 7 which drives pulleys 29. The pulleys 29 are aligned with pulleys 30 on the end of the shaft 25 remote from the chuck 24 and the pulleys 29 and 30 are drivingly connected together by means of suitable belts 31.

In view of the fact that the chuck 24 is of the pressure actuated type, the shaft 25 is of a tubular construction, as is best shown in FIGURE 3, and has a bore 32 therethrough. There is mounted within the bore 32 a control rod 33 which carries a pressure exerting piston 34. It is to be understood that the rod 33 is part of a fluid motor which is mounted within the shaft 25. In order to facilitate the coupling of suitable hydraulic lines to the shaft 25 and to the fluid motor carried thereby, the end of the shaft 25 remote from the chuck 24 is provided with a suitable rotary union assembly 35.

In order to position workpieces 16 on the chuck 24, the grinding machine 10 includes a locator, which is generally referred to by the numeral 36. The locator 36 is carried by a shaft 37 which is mounted within a housing 38 for axial reciprocatory movement. The shaft 37 has connected thereto a piston rod 38' of a double acting extensible fluid motor 39.

Referring now to FIGURES 3 and 5 in particular, it will be seen that the locator 36 includes a mounting plate 40 which is secured to the shaft 37. A second mounting plate 41 is removably secured to the mounting plate 40 by means of circumferentially spaced fasteners 42. The mounting plate 41 has the face thereof remote from the mounting plate 40 radially grooved, as is shown in FIGURE 5, each groove being referred to by the numeral 42. A base portion 43 of a work engaging finger 44 is seated in each groove 42 and is clamped in place by means of a fastener 45. It is to be noted that the mounting plate 40 is provided with a recess 46 for receiving the head 47 of the fastener 45.

The mounting plate 41 is provided with a pin 48 generally aligned with each of the grooves 42. Each pin 48 projects into the groove 42 adjacent the same and is received in a socket 49 in the associate finger base portion 42. The pin 48 is loosely received in the socket 49 and is engaged by an adjusting screw 50 which is utilized to radially locate the finger 44.

It is now pointed out that each finger 44 is of a two piece construction. Each finger 44 includes a first portion 51 which is formed integrally with the base portion 43 and an outer portion 52. The two finger portions 51 and 52 are connected together by a resilient strap 53 on the inner faces thereof with the strap 53 being secured to the finger portions 51 and 52 by means of suitable fasteners 54. It is to be noted that the finger portion 52 is recessed as at 55 so as to facilitate relative pivoting of the finger portions 51 and 52. Although fingers 44 of two piece construction are illustrated and described herein, it is to be understood that one-piece fingers or the combination of two one-piece fingers and one two-piece finger may be utilized as workpiece geometry may permit.

It is also to be noted that the finger portion 52 is provided at the outer end thereof with a workpiece engaging element in the form of a ball 56. The ball 56 is partially recessed in the end of the finger portion 52 and projects both axially and radially inwardly from the finger portion 52. The ball 56 presents surfaces which will simultaneously engage the tapered outer surface 22 of the body 17 and the shoulder 21 of the projection 20 of the workpiece 16.

Figure 4:
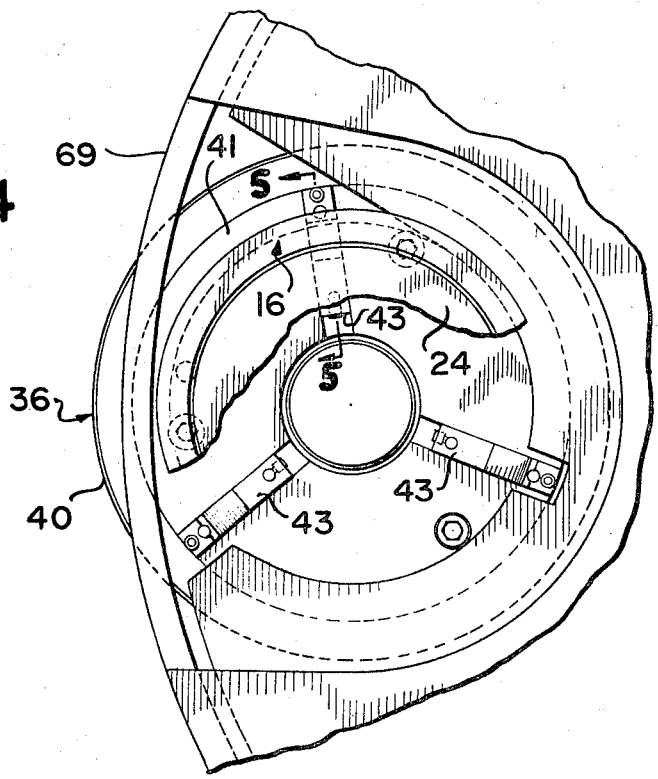
FIGURE 4 is a fragmentary transverse vertical sectional view taken along the line 4—4 of FIGURE 3 and shows more specifically the relationship of the chuck, the locator and the turret.

As is clearly shown in FIGURE 4, the locator 36 is provided with three fingers. It will be readily apparent that when the fingers of the locator 36 are accurately positioned, as they may be from the foregoing, the locator 36 will accurately position a workpiece 16 axially when the workpiece is engaged by the fingers thereof in the manner illustrated in FIGURE 5.

Referring once again to FIGURE 1 in particular, it will be seen that the shaft 37 is provided at the end thereof remote from the locator 36 with a plate 58. The plate 58 has projecting from the face thereof opposing the housing 38 a stop member 59 which is aligned with a second stop member 60 projecting from the housing 38. One of the stop members 59 or 60 is adjustable and the two stop members 59 and 60 cooperate to limit the movement of the locator 36 away from the housing 38. In this manner, the locator 36 is accurately axially positioned relative to the chuck 24, which position is clearly shown in FIGURE 3.

Referring once again to FIGURES 1 and 2 in particular, it will be seen that the grinding machine 10 includes a suitable workpiece supply mechanism which is generally referred to by the numeral 61. The supply mechanism 61 includes an upstanding plate 62 which is rigidly carried by the frame 11 of the grinding machine 10 and lies in a plane disposed normal to the axis along which the chuck 34 and the locator 36 are aligned. The plate 62 has an upper left-hand extension, as viewed in FIGURE 2, the extension being referred to by the numeral 63 and having attached thereto a suitable guide assembly 64. The guide assembly 64 has associated therewith a suitable escapement, which is referred to by the numeral 65, for periodically releasing one workpiece 16 at a time.

There is associated with the plate 62 an indexing turret 66 which is primarily in the form of a plate carried by a horizontally disposed shaft 67. The turret 66 is provided with a plurality of circumferentially spaced notches 68 for receiving workpieces 16. As is clearly shown in FIGURE 3, the turret 66 is spaced axially from the plate 62 a distance whereby the projecting portion 20 of a workpiece 16 remains confined between the plate 62 and the turret 66. In this manner, each workpiece 16 engaged by the turret 66 is confined against axial movement.

Referring once again to FIGURE 2, it will be seen that there is associated with the turret 66 a guide 69. The guide 69 lies in the same plane as the turret 66, as is shown in FIGURE 3, and prevents the radial movement of the workpieces 16 out of the turret 66. It is also to be noted that the guide 69 extends below the turret 66 and continues downwardly to the left to form part of a discharge chute which is referred to by the numeral 70. The discharge chute 70 also includes an upright guide 71 which is spaced from the plate 62 and cooperates therewith to retain a workpiece in the discharge chute 70.

At this time it is also pointed out that the plate 62 has a large opening 72 therein to permit the passage of a workpiece axially through the plate 62. This permits the removal of a workpiece 16 from the turret 66 by the locator 36 and the later repositioning of the workpiece within the same pocket 68 of the turret 66.

The turret 66 is driven by means of a motor 73 which drives a Ferguson indexing unit 74. The shaft 67 is the output shaft of the Ferguson indexing unit 74. It is to be understood that the Ferguson indexing unit 74 is a conventional piece of equipment and is so controlled in a conventional manner so as to index the turret 66 one pocket upon each actuation thereof.

The apparatus for effecting the positioning of workpieces with respect to the grinding disks 12 and 13 also includes a stripper which is generally referred to by the numeral 75 and which is best illustrated in FIGURE 3. The stripper 75 is mounted concentric with the shaft 25 and is carried by a plurality of rods 76. The rods 76 are slidably mounted in bearing assemblies 78 carried by enlargements 79 disposed at opposite ends of the bearing assembly 26. The stripper 75 is fixed against rotation and includes a mounting plate 80 which is secured to the rods 76 by means of fasteners 81. The stripper 75 also includes a front plate 82 having a plurality of sockets 83 in which ball elements 84 are positioned. The ball elements 84 are rotatable within the sockets 83 and project forwardly through the face of the plate 82. It is to be noted that each ball 84 is urged out of its socket 83 by means of a spring plate 85 which is secured to the plate 82 by means of fasteners 86 and a backing ring 87.

Figure 1:
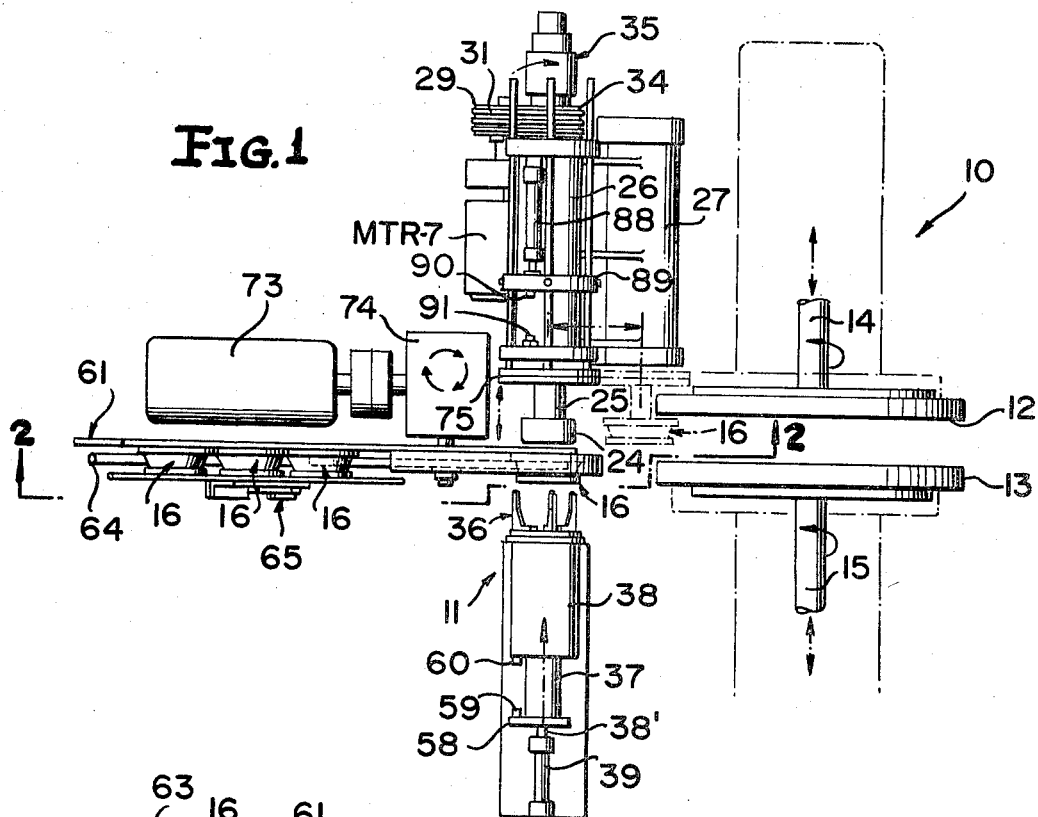
FIGURE 1 is a plan view showing schematically the details of the grinding machine which is the subject of this invention.

It is to be noted from FIGURE 1 that the stripper 75 is moved axially of the shaft 25 by means of a double acting fluid motor 88. The fluid motor 88 is coupled to a plate 89 which, in turn, is mounted on the rods 76 intermediate the enlargements 79. It is also to be noted that the plate 89 is provided with a projecting stop 90 which is engageable with an adjustable stop 91 carried by the projection 79 which is illustrated in FIGURE 3. The adjustable stop 91 is threadedly engaged in an internally threaded bore 92 and is locked in place by means of a set screw 93. It is to be noted that the stop 91 has a head portion 94 which may be utilized for the turning and positioning thereof. The stop members 90 and 91 cooperate to limit the movement of the stripper 75 to the right, as viewed in FIGURE 3.

The stripper 75 has two functions. The obvious function is the removal of ground workpieces from the chuck. The second function of the stripper 75 is to facilitate the positioning of the locator 36 with respect to a workpiece 16. When the stripper 75 has moved to the right, as viewed in FIGURE 3, it is positioned within the opening 72 of the plate 62. However, the face plate 82 thereof does not project to the right of the right face of the plate 62 so as to interfere with the indexing of the turret 66. In this position, the stripper 75 functions as a back-up for the next positioned workpiece and holds the next positioned workpiece against movement to the left, as viewed in FIGURE 3, when it is being engaged by the locator 36.

Inasmuch as the workpiece directly engages the spring loaded balls 84 when the locator 36 seats against the workpiece, the impact of the seating operation is absorbed by the spring loaded balls 84, which are substantially in line with balls 56 of locator finger portion 52. The in-line disposition of three balls 84 and three balls 56 assures firm seating of balls 56 against workpiece surface 21, without distortion of workpiece 16, under the axial forces applied thereto.

At this time it is pointed out that each of the fingers is provided at the extreme end thereof with a screw 96. The screw 96 is threadedly engaged into the finger portion 52 and has the head 97 thereof projecting to the left therefrom, as viewed in FIGURE 5. It is to be noted that the head 97 of each screw 96 projects to the left beyond the associated ball 56. The balls 56 are formed of carbide so as to minimize wear. When there is no workpiece positioned between the locator 36 and the stripper 75 during actuation of the machine, the screw heads 97 will engage the stripper 75 to prevent direct contact of the balls 56 therewith, and thus further minimize wear or physical damages of balls 56.

Referring now once again to FIGURES 1 and 2 in particular, it will be seen that the support element 27 is pivotable about the shaft 28 in a clockwise direction from its normal position. Thus, after a workpiece has been clamped on the chuck 24 and the locator 36 and the stripper 75 retracted, the chuck and the associated workpiece may be swung in between the grinding disks 12 and 13 to the dotted line position of the workpiece 16 shown in both FIGURE 1 and FIGURE 2.

It is pointed out here that the pockets 68 of the turret 66 are accurately shaped so as to accurately control the position of each workpiece 16 at the time it is engaged by the locator 36. In view of this, the turret 66 is notched, as at 98, to clear a finger of the locator 36 as the locator 36 passes the turret 66.

*Operation*

Figure 6:
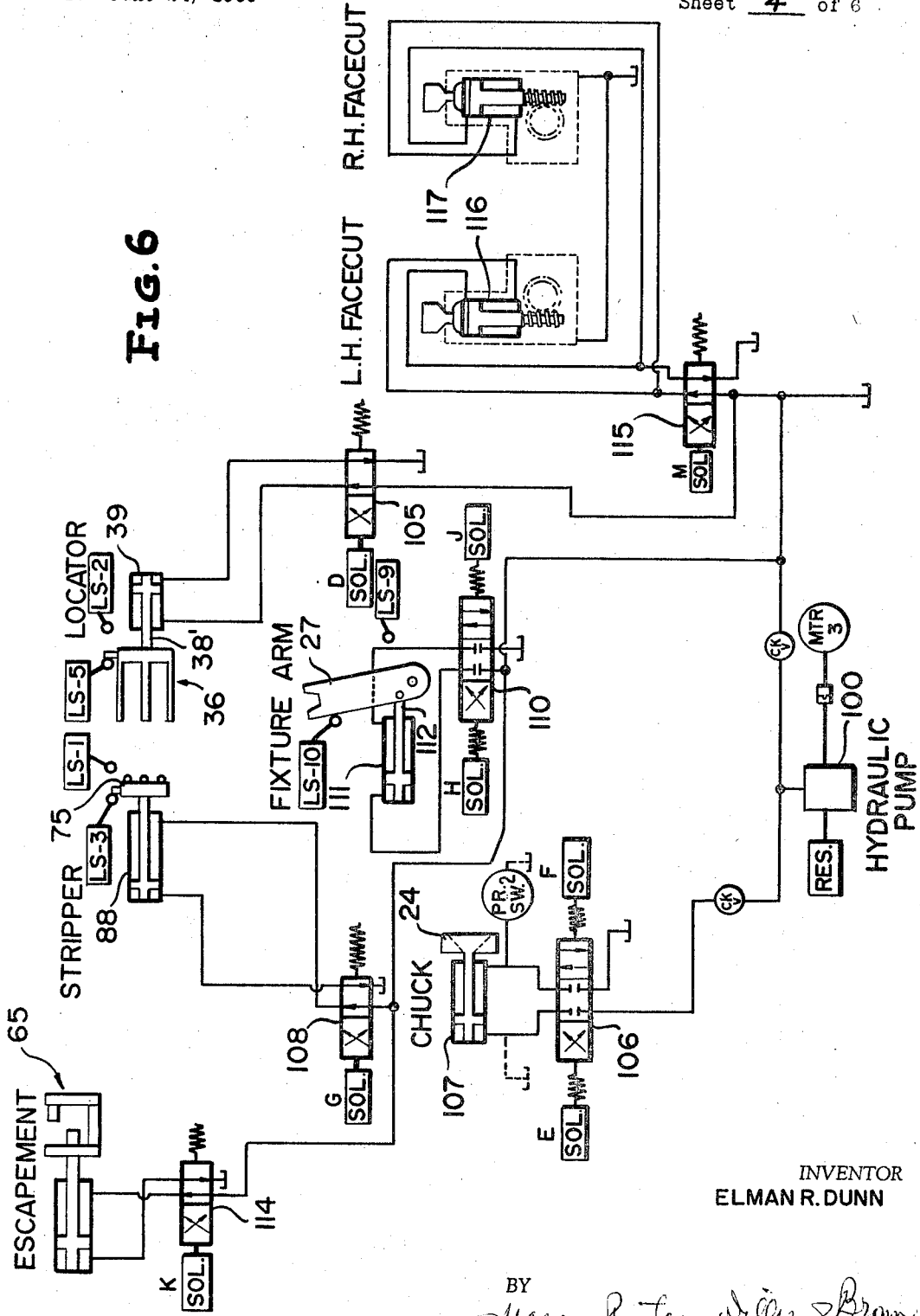
FIGURE 6 is a schematic view showing the general details of the various actuating mechanisms of the machine.

It is to be understood that in the at rest position of the grinding machine 10, the stripper 75 is in its advanced position and the various switches are in the positions shown in the wiring diagram of FIGURES 7 and 7A. In the first step of the operation of the machine, the switch marked "HYDR. PUMP" is closed closing relay 3M. This results in the closing of the contacts 3M1, 3M2, 3M3 and 3M4, with the contact 3M1 forming a holding circuit around the "HYDR. PUMP" switch and the other three contacts energizing MTR 3 for the hydraulic pump 100 shown in FIGURE 6. At the same time, relay 1CR is energized to close the four contacts thereof to complete the electrical circuit to the remainder of the electrical system. Next the start switches 101 and 102 are closed to energize the relays 1M and 2M which results in the closing of the contacts 1M1 and 2M1 to form holding circuits around the start switches 101 and 102, respectively. The energization of the relays 1M and 2M close the contacts controlling the operation of MTR 1 and MTR 2 so that the grinding disks 12 and 13 are rotated. The cycle start switch 103 is then closed and inasmuch as limit switch 10LS is in its closed position and relay 24CR is energized, the circuit to the relay 4CR is completed. The energization of relay 4CR results in the closing of contact 4CR1 to provide a holding circuit for the relay 4CR. Inasmuch as contact 22CR1 and limit switch 1LSA are closed, relay 5CR is energized. The energization of the relay 5CR results in the closing of the contact 5CR1 to form a holding circuit bypassing limit switch 1LSA. The energization of the relay 5CR also results in the closing of the contacts 5CR2, 5CR3, 5CR4, 5CR5 and 5CR6.

At the same time the start switches 101, 102 and 103 are closed, the index switch 104 will be closed to energize relay 7CR. This will result in the circuit to 8CR being opened due to the opening of contact 7CR2. When the relay 7CR is energized, contact 7CR1 will close to complete the circuit to the Ferguson indexing unit and will cause the turret 66 to index to present a next workpiece 16 to the position between the locator 36 and the chuck 24. At the completion of the indexing of the turret 66, the index switch 104 will open, opening the circuit to the relay 7CR with the result that the contact 7CR1 will again open and the contact 7CR2 will again close. At this time the circuit to the relay 8CR is completed.

The energization of the relay 8CR will result in the closing of the contacts 8CR1 and 8CR2 to energize solenoid D. The energization of the solenoid D will result in the shifting of the spring loaded valve 105 to a position whereby hydraulic fluid from the hydraulic pump 100 will be directed to the right hand end of the fluid motor 39 so as to move the piston rod 38' thereof to the left and to advance the locator 36. The locator 36 will then engage the workpiece 16 positioned by the turret and backed up by the stripper 75 with the result that the workpiece will be fully seated within the locator 36. Further advancement of the locator 36 will result in the movement of the stripper 75 to the left against the relatively light resistance of the fluid motor 88 which controls the position of the stripper 75. The locator 36 moves to the left until the stops 59 and 60 limit the movement thereof, at which time the workpiece carried by the locator 36 is accurately positioned in telescoped relation to the chuck 24. At this time limit switch LS5 is closed to energize timer 3TR. The energization of the timer 3TR results in the closing of the switch 3TR1 and the energization of the relay 9CR. The energization of relay 9CR results in the closing of the holding circuit bypassing limit switch 5LS. It also results in the opening of the normally closed contact 9CR2 to de-energize relay 10CR and the opening of contacts 10CR1 and 10CR2, thereby de-energizing solenoid F. At the same time, the energization of relay 9CR results in the closing of contact 9CR3 and 9CR4 to energize solenoid E with the result that the valve 106 is shifted so that fluid under pressure is directed to the left end of a fluid motor assembly 107 of which the rod 33 is a part. This results in the pressurization of the chuck 24 and the clamping of the workpiece carried by the locator 36 in the position determined by the locator. At the same time, pressure switch 2PS is closed to energize timer 12TR. The energization of the timer 12TR results in the closing of the switch 12TR1 and the energization of relay 12CR.

The energization of the relay 12CR results in the opening of the normally closed contact 12CR1 to de-energize relay 11CR. This results in the opening of the contacts 11CR1 and 11CR2, de-energizing solenoid G. As a result, the spring loaded control valve 108 is moved to the position shown in FIGURE 6 and fluid under pressure is delivered to the right end of the fluid motor 88 to effect the retraction of the stripper 75. At the same time, the circuit to relay 8CR will be opened due to the opening of normally closed contact 12CR2 with the result that contact 8CR1 and 8CR2 will open and the solenoid D will be de-energized. This will result in the shifting of the valve 105 to the position shown in FIGURE 6 to effect the operation of the fluid motor 39 to retract the locator 36. When the stripper 75 and the locator 36 reach their retracted positions, limit switch LS 3 and limit switch LS 2 will be closed with the result that the circuit to relay 6CR is completed and this relay is energized.

The energization of relay 6CR will result in the closing of contact 6CR1 and the energization of relay 14CR. The energization of the relay 14CR will result in the opening of the normally closed contact 14CR1 to de-energize relay 13CR. This will result in the opening of the contacts 13CR1 and 13CR2 to de-energize solenoid H. At the same time contacts 14CR2 and 14CR3 will close to energize solenoid J to shift the valve 110 to the left with the result that fluid under pressure is directed to the left end of a double acting fluid motor 111. The fluid motor 111 has a piston rod 112 which is connected to the support element or fixture arm 27 which carries the chuck 24 and the stripper. This will result in the swinging of the chuck 24 in a clockwise direction from its solid line position of FIGURE 2 to the dotted line position thereof.

It is also to be noted that when the relay 6CR is energized, the contact 6CR2 is closed and this results in the energization of relay 7M. The energization of relay 7M results in the closing of the contacts 7M4, 7M5 and 7M6 to effect the operation of MTR 7 whereby the chuck 24 is rotated. At the same time 7M2 and 7M3 are closed.

It is also pointed out that when contact 6CR1 is closed, the circuit through normally closed contact 23CR1 is completed and relay 15CR is energized. The energization of relay 15CR results in the closing of contacts 15CR1 and 15CR2 to energize solenoid K to effect the shifting of the valve 114 to a position wherein the escapement 65 is actuated to release one workpiece 16 and permit the same to move into the open uppermost pocket 68 of the turret 66.

It is to be understood that when the fixture arm 27 is swung in a clockwise direction, limit switch LS 10 will open to de-energize relay 24CR. As a result, contacts 24CR1, 24CR2, and 24CR4 will open while normally closed contact 24CR3 will close. The fixture arm continues to advance until limit switch 9LS is closed with the result that the relay 23CR is energized. The energization of the relay 23CR will result in the opening of the normally closed contact 23CR1 and solenoid K to de-energize the relay 15CR and permit the valve 114 to return to its normal position. At the same time, contact 23CR2 is closed to energize relay 17CR. The energization of relay 17CR results in the closing of contacts 17CR1 and 17CR2 to energize solenoid M. The energization of solenoid M results in the shifting of the control valve 115 and the actuation of advance mechanism 116 and 117 for the grinding disks 12 and 13. This will result in the movement of the grinding disks towards one another and into contact with the opposite ends of the workpiece 16 positioned therebetween. The grinding disks 12 and 13 will move together to effect the necessary face cuts on the ends of the workpiece until a conventional gauge, not shown, determines that the necessary grinding operation has been performed. At this time, the gauge will effect the opening of gauge switch 118 and the closing of gauge switch 119. The opening of gauge switch 118 will result in the opening of the circuit to relay 17CR and the de-energization of solenoid M. The valve 115 will then be moved by the spring thereof to the position shown in FIGURE 6 to effect the retraction of the grinding disks 12 and 13. At the same time, inasmuch as limit switch 1LSB is now closed, relay 22CR will be energized. The energization of relay 22CR will result in the opening of the normally closed contact 22CR1 to interrupt the circuit to relay 5CR. The energization of the relay 22CR will also result in the opening of the contact 22CR2, but the circuit to relay 9CR will not be opened at this time inasmuch as normally closed contact 24CR3 is still closed. The contact 22CR3, which is normally opened, will close and provide a holding circuit bypassing gauge switch 119. It is to be understood that the gauge functions to operate the gauge switches 118 and 119 only momentarily and after the retraction of the grinding disks 12 and 13 has commenced, the gauge switch 118 will return to its normally closed position and the gauge switch 119 will return to its normally opened position.

It is to be noted that inasmuch as relay 5CR is de-energized, contact 5CR6 is opened and the relay 17CR remains de-energized despite the closing of gauge switch 118. In a like manner, the contact 5CR4 is opened and the relay 14CR is de-energized, de-energizing solenoid J. The de-energization of relay 14CR results in the closing of normally closed contact 14CR1 to again energize 13CR with the result that the solenoid H is again energized by the closing of contacts 13CR1 and 13CR2. This results in the shifting of the valve 110 to the right in FIGURE 6 to effect the counterclockwise movement of the fixture arm 27.

When the fixture arm 27 moves in a counterclockwise direction, limit switch 9LS is opened, de-energizing relay 23CR. This results in the opening of the circuit to relay 7M, thereby ceasing the rotation of the chuck motor MTR7.

When the fixture arm 27 moves back to its original position placing the chuck 24 in alignment with the locator 36, the limit switch 10LS again closes to again energize the relay 24CR. The energization of the relay 24CR will result in the opening of contact 24CR3 to de-energize the timer 3TR inasmuch as the circuit to the timer 3TR is otherwise open due to the fact that the contact 5CR3 and the normally closed contact 22CR2 are opened. This will also result in the opening of the circuit to the relay 9CR with the result that the solenoid E is de-energized. At the same time, contact 24CR4 and the normally closed contact 9CR2 will close to energize relay 10CR. The energization of relay 10CR will result in the closing of contact 10CR1 and 10CR2 to energize solenoid F. The energization of solenoid F will result in the shifting of the valve 106 to the left in FIGURE 6 so as to release the chuck 24.

The movement of the valve 106 under the influence of solenoid F will result in the opening of switch 2PS with the resultant de-energizing of relay 12CR and timer 12TR. As a result, normally closed contact 12CR1 will close to energize relay 11CR. The energization of relay 11CR will result in the closing of contacts 11CR1 and 11CR2 to energize solenoid G. The energization of solenoid G will result in the shifting of the valve 108 to the right to move the stripper 75 to the right. The movement of the stripper 75 to the right will result in the movement of the released ground workpiece off of the chuck 24 and back into the pocket of the turret 66 from which it was previously removed. When the stripper reaches its advanced position, it will engage limit switch LS1 and result in the again closing of limit switch 1LSA and the opening of limit switch 1LSB and the apparatus is now ready for a further cycle of operation upon the momentary closing of index switch 104.

It is to be understood at this time that the operation of the grinding machine 10 may be readily made so that it will automatically function as long as there is a workpiece 16 positioned in the uppermost pocket of the turret. However, the automatic control of the machine plays no part in this invention, and therefore, will not be described hereinafter. It is to be understood, however, that when the turret 66 is next indexed, the ground workpiece will be rotated from its right-hand position in the turret 66, as shown in FIGURE 2, to a lowered position where it will freely enter the discharge chute 70.

Although only a preferred embodiment of the invention has been specifically illustrated and described herein, it is to be understood that minor variations may be made in the disclosed grinding machine without departing from the spirit and scope of the invention, as defined in the appended claims.

I claim:
1. In a machine tool for machining a workpiece having an annular flange portion,
   (a) a cutting tool on said machine tool,
   (b) means for effecting axial location of a workpiece relative to said cutting tool comprising
   (c) an axially movable locating device having locating members for engaging said flange portion and moving said workpiece axially,
   (d) means for holding said workpiece firmly in axial and radial engagement with said locating device,
   (e) and positive stop means independent of a workpiece for stopping the axial movement of said locating device in a workpiece locating position.
2. The machine tool of claim 1 together with means for engaging and rotatably supporting said workpiece while it is held by said locating device and said holding means.

3. The machine tool of claim 1 together with
   (a) means for engaging and rotatably supporting said workpiece while it is held by said locating device and said holding means,
   (b) and control means for retracting said locating device and said holding means preparatory to machining said workpiece.
4. The machine tool of claim 1, together with
   (a) means for engaging and rotatably supporting said workpiece while it is held by said locating device and said holding means,
   (b) and control means operable in response to operation of said work engaging means for retracting said locating device and said holding means preparatory to machining said workpiece.
5. In a machine tool for machining a ring-like workpiece having an annular flange portion and an adjacent portion of circular cross-section,
   (a) a cutting tool on said machine tool,
   (b) means for effecting axial location of a workpiece relative to said cutting tool comprising
   (c) an axially movable locating device having angularly spaced locating members for simultaneously engaging said flange portion and the portion adjacent thereto,
   (d) means for holding said workpiece firmly in axial and radial engagement with said locating device,
   (e) positive stop means directly associated with said locating device for stopping said axial movement of said locating device with the workpiece in operative alignment with said cutting tool,
   (f) an expanding chuck for engaging and rotatably supporting said workpiece in located position,
   (g) control means for retracting said locating device and said holding means preparatory to machining said workpiece,
   (h) and means operable in response to said retracting movement for advancing said workpiece into operative engagement with said cutting tool.
6. In a machine tool for machining a ring-like workpiece having an annular flange portion and an adjacent portion of circular cross-section,
   (a) a cutting tool on said machine tool,
   (b) means for effecting axial location of a workpiece relative to said cutting tool comprising
   (c) an axially movable locating device having angularly spaced locating members for simultaneously engaging said flange portion and the portion adjacent thereto,
   (d) means for holding said workpiece firmly in axial and radial engagement with said locating device,
   (e) positive stop means remote from said locating device and directly associated with said locating device for stopping said axial movement of said locating device with the workpiece in operative alignment with said cutting tool,
   (f) an expanding chuck for engaging and rotatably supporting said workpiece in located position,
   (g) control means for retracting said locating device and said holding means preparatory to machining said workpiece,
   (h) and means operable in response to said retracting movement for advancing said workpiece into operative engagement with said cutting tool.
7. A workpiece positioning apparatus particularly adapted for positioning a workpiece of the type including a tubular body and a reference shoulder, said positioning apparatus comprising co-axially positioned locator and chuck, support means mounting said locator for axial movement between a position spaced from said chuck to a position adjacent said chuck, and workpiece supply means for positioning a workpiece in axial alignment with said locator between said locator and said chuck whereby when said locator is moved towards said chuck it will first pick up and reference a workpiece and then accurately position the workpiece for clamping engagement by said chuck, support means mounting said locator for axial workpiece from said chuck, and a stripper mounted coaxial with said chuck remote from said locator for stripping a workpiece from said chuck and returning the workpiece to said supply means.

8. The positioning apparatus of claim 7 wherein said supply means is in the form of a turret.

9. A grinding machine for performing a face grinding operation on an end of a workpiece having a tubular body and a reference shoulder, said grinding machine comprising a grinding disk and a workpiece positioning apparatus, said positioning apparatus comprising coaxially positioned locator and chuck laterally offset from said grinding disk, support means mounting said locator for axial movement between a position spaced from said chuck to a position adjacent said chuck, and workpiece supply means for positioning a workpiece in axial alignment with said locator between said locator and said chuck whereby when said locator is moved towards said chuck it will first pick up and then accurately position the workpiece for clamping engagement by said chuck, and other support means mounting said chuck for lateral movement independent of said locator to position a workpiece in opposed relation to said grinding disk.

10. A workpiece positioning apparatus particularly adapted for positioning a workpiece of the type including a tubular body and a reference shoulder, said positioning apparatus comprising co-axially positioned locator and chuck, support means mounting said locator for axial movement between a position spaced from said chuck to a position adjacent said chuck, and workpiece supply means for positioning a workpiece in axial alignment with said locator between said locator and said chuck whereby when said locator is moved towards said chuck it will first pick up and reference a workpiece and then accurately position the workpiece for clamping engagement by said chuck, said supply means also being adapted to receive a workpiece from said chuck, and a stripper mounted co-axial with said chuck remote from said locator for stripping a workpiece from said chuck and returning the workpiece to said supply means, and means for simultaneously moving said stripper and said locator in opposed relation to clamp a workpiece therebetween for movement to said chuck with said stripper cooperating with said locator to position the workpiece.

11. A workpiece positioning apparatus particularly adapted for positioning a workpiece of the type including a tubular body and a reference shoulder, said positioning apparatus comprising a chuck particularly adapted to clamp the workpiece, a locator, means mounting said locator coaxially with said chuck and for axial movement between a position spaced from said chuck and a position adjacent said chuck, a stripper, means mounting said stripper co-axially of said chuck remote from said locator and for movement between a position spaced from said chuck and a position adjacent said chuck, and means for simultaneously moving said locator and said stripper in opposed relation to clamp a workpiece between said locator and said stripper in an accurate predetermined position aligned with said chuck for engagement by said chuck.

12. The apparatus of claim 11 wherein said stripper has resiliently mounted workpiece engaging means opposing said locator to provide for the absorption of shock which may occur when a workpiece is clamped between said locator and said stripper.

13. The apparatus of claim 11 wherein said locator has accurately positioned locating surfaces for engagement with workpieces, and a guard projecting towards said stripper from said locator adjacent each locating surface out of alignment with a normal workpiece position and in direct alignment with said stripper for preventing engagement of said locating surfaces with said stripper in the absence of a workpiece.

14. The apparatus of claim 11 wherein said locator has accurately positioned locating surfaces for engagement with workpieces, and said stripper has resiliently mounted workpiece engaging surfaces in aligned opposed relation to said locating surfaces to provide for the firm seating of a workpiece against said locating surfaces.

15. The apparatus of claim 14 wherein both said locating surfaces and said resiliently mounted surfaces are formed by balls.

References Cited

UNITED STATES PATENTS

| 1,980,440 | 11/1934 | Rupple. | |
| 2,092,895 | 9/1937 | Stevens | 51—215 X |
| 2,805,524 | 9/1957 | Silven | 51—215 X |
| 2,973,532 | 3/1961 | Rosl | 51—215 X |
| 3,239,969 | 3/1966 | Perry | 51—215 |

FOREIGN PATENTS

| 695,520 | 8/1940 | Germany. |

HAROLD D. WHITEHEAD, *Primary Examiner.*

U.S. Cl. X.R.

51—215